United States Patent
Stewart et al.

(10) Patent No.: US 8,478,594 B2
(45) Date of Patent: Jul. 2, 2013

(54) SYSTEMS AND METHODS FOR AUTOMATICALLY DETERMINING CULTURE-BASED BEHAVIOR IN CUSTOMER SERVICE INTERACTIONS

(75) Inventors: Osamuyimen T. Stewart, Piscataway, NJ (US); David M. Lubensky, Brookfield, CT (US); Joyram Chakraborty, Baltimore, MD (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/572,215

(22) Filed: Aug. 10, 2012

(65) Prior Publication Data

US 2012/0310629 A1    Dec. 6, 2012

Related U.S. Application Data

(63) Continuation of application No. 12/196,744, filed on Aug. 22, 2008.

(51) Int. Cl.
*G10L 15/00* (2006.01)
(52) U.S. Cl.
USPC ............................ 704/257; 704/270; 704/275
(58) Field of Classification Search
USPC ........................................ 704/257, 270, 275
See application file for complete search history.

(56) References Cited

U.S. PATENT DOCUMENTS 6,212,502 B1 * 4/2001 Ball et al. ...................... 704/270

OTHER PUBLICATIONS

Wu et al. "Evaluating the Impact of Collectivism and Individualism on Argumentative Writing by Chinese and North American College Students" Research in the Teaching of English, vol. 35, Nov. 2000).*
Stewart, Osamuyimen T., et al. "Did Hofstede Get it Right? Enculturating Automatic Speech Recognition Systems." presented at Workshop on Enculturating Conversational Interfaces by Socio-Cultural Aspects of Communication. International Conference on Intelligent User Interfaces (IUI), Grand Canary Island, Spain, Jan. 13-16, 2008.

* cited by examiner

*Primary Examiner* — Vincent P Harper
(74) *Attorney, Agent, or Firm* — Tutunjian & Bitetto, P.C.; Anne V. Dougherty

(57) ABSTRACT

Systems and methods are provided to automatically determine culture-based behavioral tendencies and preferences of individuals in the context of customer service interactions. For example, systems and methods are provided to process natural language dialog input of an individual to detect linguistic features indicative of individualistic and collectivistic behavioral tendencies and predict whether such individual will be cooperative or uncooperative with automated customer service.

22 Claims, 2 Drawing Sheets

SYSTEMS AND METHODS FOR AUTOMATICALLY DETERMINING CULTURE-BASED BEHAVIOR IN CUSTOMER SERVICE INTERACTIONS

CROSS-REFERENCE TO RELATED APPLICATIONS

This application is a continuation of U.S. application Ser. No. 12/196,744, filed on Aug. 22, 2008, which is incorporated by reference herein in its entirety.

TECHNICAL FIELD

Embodiments of the invention relate to systems and methods to automatically determine culture-based behavioral tendencies and preferences of individuals in the context of customer service interactions and, in particular, systems and methods for processing natural language dialog input of an individual to detect linguistic features indicative of individualistic and collectivistic behavioral tendencies and predict whether such individual will be cooperative or uncooperative with automated customer service.

BACKGROUND

Technical innovations in speech recognition technologies and information technologies have led to the development and widespread implementation of automated systems that support human-machine natural dialog interaction. For example, Interactive Voice Response (IVR) systems provide callers with automated customer service and self-help applications that can be accessed and controlled through speech dialog with the system over a telephone. These automated applications are designed with a goal of increasing customer satisfaction by providing fast access to information and services through automated customer service interactions, while decreasing operational costs associated with having to maintain a large pool of personnel to support live customer assistance.

Depending on a person's culturally-based latent (subconscious) tendencies and preferences with regard to automated and live customer service in the context of a given task, however, certain individuals may have a tendency to be uncooperative with automated systems and prefer live customer service. In this regard, automated systems are typically designed to provide automated customer service as the primary option, while providing human customer assistance as a secondary option when a caller manifests a tendency or preference for human assistance.

By way of example, automated customer service systems are typically designed to determine an individual's tendency to be uncooperative with automated assistance based on some external behaviors of the individual that are indicative of the individual's unwillingness to use (or cooperate with) the automated customer service system. For instance, when presented with a choice of options from a main menu, instead of picking or selecting from one of the options, uncooperative individuals will exhibit certain external behaviors, including but not limited to:

(a) pressing "zero" to reach a human Agent (in a touch-tone system);

(b) explicitly asking for a "customer service representative" or pressing "zero" (in a speech dialog system);

(c) staying silent so that the system (touch tone or speech) will time out and possibly transfer to an Agent; or (d) uttering profanities or otherwise verbalizing the individual's disdain for automated customer service.

Although external individual behaviors such as those mentioned above are useful indicators that can provide some measure of an individual's preferences for human customer assistance over automated customer service, the use of such indicators to assess individual preference in customer service interactions does not provide any systematic cognitive-psychological basis for determining individual behavioral tendencies and preferences. Essentially, such external indicators are systematically and arbitrarily contrived, and cannot be applied as metrics in various ways for determining individual type from observable behavior, which leads to inconsistent (unverifiable) conclusions.

In view of the above, in the context of customer service interactions, there exists a significant challenge with regard to understanding and predicting an individual's behavioral tendencies and preferences for automated or human customer service assistance without relying on the more erratic features of conventional approaches which, in turn, rely on an individuals' external behavior as indices of an individual's tendency to be cooperative or uncooperative.

SUMMARY

In general, exemplary embodiments of the invention include systems and methods to automatically determine culture-based behavioral tendencies and preferences of individuals in the context of customer service interactions and, in particular, systems and methods for processing natural language dialog input of an individual to detect linguistic features indicative of individualistic and collectivistic behavioral tendencies and predict whether such individual will be cooperative or uncooperative with automated customer service.

In one exemplary embodiment, an automated method for using cultural awareness for customer service systems includes receiving as input natural language dialog responses from an individual in response to system prompts, and processing the natural language dialog responses to automatically determine a culturally acquired behavioral tendency of the individual to be cooperative or uncooperative with automated customer service.

In another exemplary embodiment, natural language dialog responses are processed to detect linguistic features that are indicative of culturally acquired behaviors for a plurality of distinct culture types, and the detected linguistic features are used to classify the individual as likely having a distinct one of the plurality of culture types.

In one exemplary embodiment of the invention, the natural language dialog responses are processed to detect linguistic features that are indicative of culturally acquired behaviors for individualism and collectivism. The individual is directed to a live customer service agent if the individual is determined to be collectivistic, while automated customer service is provided to the user if the individual is determined to be individualistic.

These and other exemplary embodiments, features and advantages of the present invention will be described or become apparent from the following detailed description of exemplary embodiments, which is to be read in connection with the accompanying drawings.

DETAILED DESCRIPTION OF EXEMPLARY EMBODIMENTS

Figure 1:
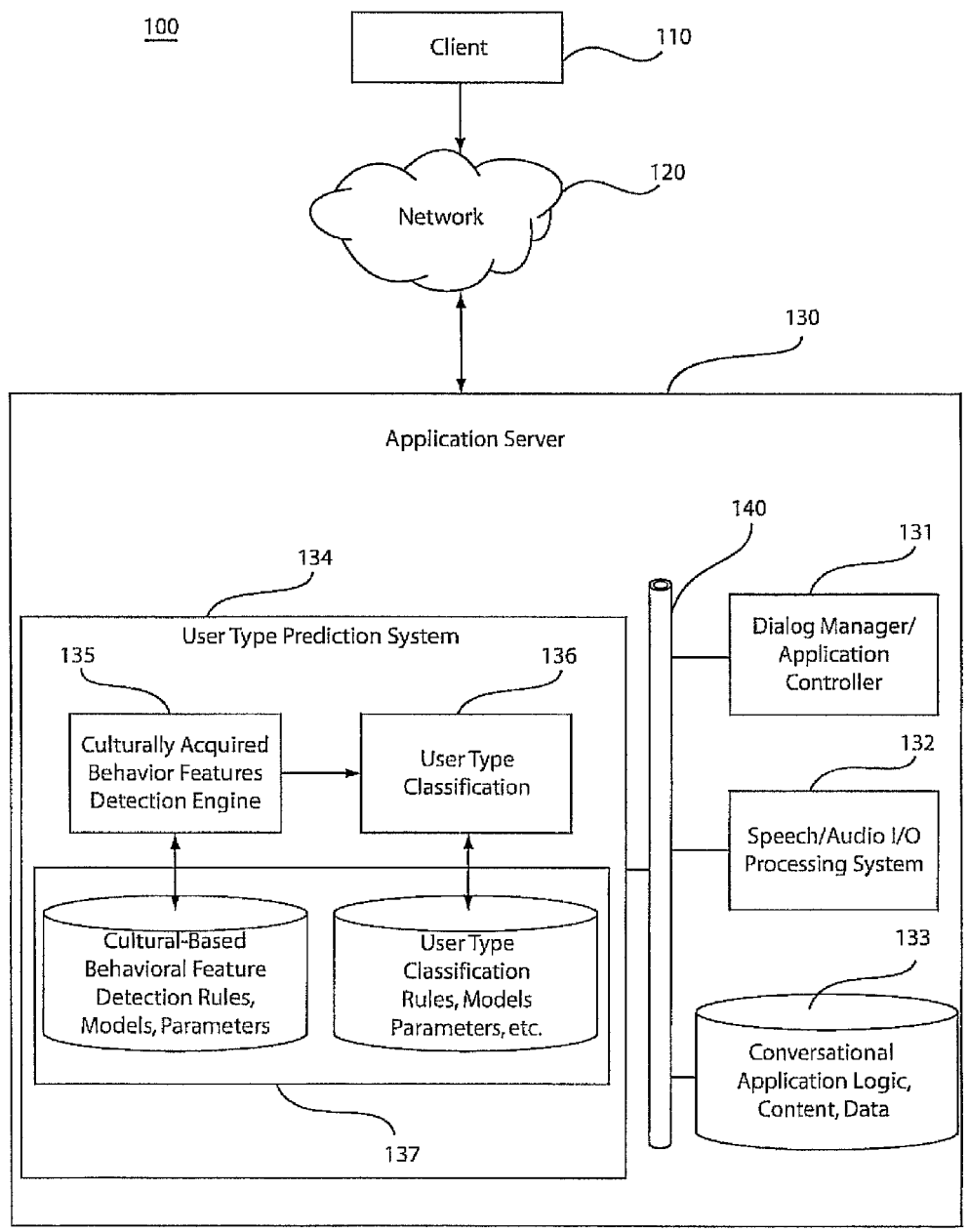
FIG. 1 schematically illustrates a computing system in which cultural knowledge is used to automatically determine culture-based behavioral tendencies and preferences of individuals in the context of customer service interactions, according to an exemplary embodiment of the invention.

In general, systems and methods according to exemplary embodiments of the invention as described in further detail below use cultural knowledge in the context of customer service interactions to automatically determine, from an individual's natural language dialog responses, behavioral tendencies and preferences of the individual that are indicative of cross cultural or nationalistic preferences for live human assistance or automated assistance. In general, exemplary embodiments of the invention are based on work in cross-cultural research using the cultural dimension model of Geert Hofstede. Hofstede's model of cultural dimensions is based on five factors: power distance; uncertainty avoidance; masculinity vs. femininity; individualism vs. collectivism; and time orientation. One of the main dimensions on which cultures differ is individualism-collectivism. Individualism places greater emphasis on personal achievement and self-reliance. Collectivism, by contrast, places priority on the welfare and unity of the group.

Exemplary embodiments of the invention are generally based on Hofstede's model with regard to cultural traits of individualism and collectivism, wherein individualism-collectivism is a cultural variable that can be measured across nationalities based on natural language dialog responses by individuals in the context of customer service interactions. More specifically, in accordance with exemplary embodiments of the invention, culturally aware systems and methods are implemented to automatically predict an individual's culturally acquired behavior with respect to collectivism-individualism to gauge whether the individual has a tendency to be cooperative or uncooperative with automated customer service. In the context of customer service interactions, cultural knowledge and models are used to analyze natural language dialog from an individual to detect cognitive-psychological-linguistic features that are used as indicators to determine individual type with respect to individualism versus collectivism and thereby predict an individual's tendency to be cooperative or uncooperative with automated customer service.

In general, an underlying framework is premised on automated methods based on the psychological-cognitive distinction between individualism versus collectivism and can be automatically and systematically derived from the introductory aspects of a dialog (usually between 2 to three conversational turns) by applying a cross cultural linguistically-based individualism-collectivism feature detection process to natural language responses of a individual during customer service interactions. With this approach, the behavioral features of the caller is determined based on the associated set of linguistic markers included in an algorithm that (sub-consciously) automatically identifies the psychological-linguistic properties of individuality or collectivism from the individuals spoken utterance within, for example, the first three dialog turns. Using these linguistic markers to determine individual-type helps to distinguish between two classes of individuals as follows:

(a) Individuals manifesting Individualistic behavior are less likely to be uncooperative callers (and thus more prone to automated self service); and (b) Individuals manifesting Collectivistic behavior are more likely to be uncooperative callers (and thus more prone to asking for human or live Agent service).

From a psychological-cognitive perspective, a typical individualistic person is motivated by personal achievement and displays the tendency of self-accomplishment (e.g., I did it myself) which translates into an image of success. Moreover, due to emphasis on change, an individualistic individual is likely to break from the mold and try a new and unique approach to solving a problem such as using automated service. By contrast, a typical collectivistic person is likely to wait on hold for a long time to speak with a human agent, and often favoring traditional approaches of solving a problem instead of radical departures from the historical process.

Exemplary embodiments of systems and methods for using cultural knowledge to automatically determine culture-based behavioral tendencies and preferences of individuals in the context of customer service interactions, according to an exemplary embodiment of the invention, will now be discussed in further detail with reference to FIGS. 1 and 2. It is to be understood that the systems and methods described herein in accordance with the present invention may be implemented in various forms of hardware, software, firmware, special purpose processors, or a combination thereof. In particular, exemplary systems and methods described herein may be implemented in software comprising program instructions that are tangibly embodied on one or more program storage devices (e.g., hard disk, magnetic floppy disk, RAM, CD ROM, DVD, ROM and flash memory), and executable by any computing device or machine comprising suitable architecture. It is to be further understood that because the constituent system modules and method steps depicted in the accompanying Figures can be implemented in software, the actual connections between the system components (or the flow of the process steps) may differ depending upon the manner in which the application is programmed. Given the teachings herein, one of ordinary skill in the related art will be able to contemplate these and similar implementations or configurations of the present invention FIG. 1 schematically illustrates a computing system in which cultural knowledge is used to automatically determine culture-based behavioral tendencies and preferences of individuals in the context of customer service interactions, according to an exemplary embodiment of the invention. More specifically, FIG. 1 illustrates an exemplary embodiment of a client/server system (100) including a client access device (110) that can communicate with an application server (130) over a communications network (120). The client access device (110) may be any type of device such as a PDA (personal digital assistant), mobile cell phone, standard telephone, etc., capable of communicating with the application server (130) over the communications network (e.g., LAN, WAN, Internet, PSTN, and/or wireless). The application server (130) can support various types of automated information access applications such as interactive voice response (IVR) systems, web-based electronic commerce applications, information retrieval systems, etc., and other types of applications in automated customer service used to provide individual access to information or a service. The application server (130) includes a dialog manager (131) (application controller), a speech/audio I/O processing system (132), application logic/content (133), and an individual type prediction system (134), which communicates over a system bus or network (140). The individual type prediction system (134)

includes a behavior feature detection engine (135), an individual type classification system (136), and a culture knowledge base (137) which includes rules, models, parameters, etc, to support cultural behavior analysis and individual culture type classification processed performed by system modules (135) and (136).

In general, the dialog manager (131) manages and controls the flow of dialog and interaction between the individual and the automated application that is implemented according to the business logic and backend data (133) associated with the application. The dialog manager controls the dialog (or sub-dialog) process based on a current dialog context (application state) and interpretation of an individual command/request/query, according to the application logic.

The I/O processing system (132) includes various engines for processing speech, audio and/or text I/O for human-computer interactive dialog. The I/O processing system (132) includes various I/O processing engines to support one or more user interface (UI) modalities (e.g., graphical user interface (GUI), speech, dual tone multi-frequency (DTMF), etc.) supported by the automated application. For example, to support speech-based individual interface modality, the I/O processing system (132) may include, for example, an ASR (automatic speech recognition) to decode spoken input from an individual, a NLU (natural language understanding) engine to convert natural language sentences (as decoded by the ASR) into a semantic representation of an individual command within the context of the application dialog, and other speech decoding applications that are implemented for the given application (such as speaker identification engines to support biometric verification). The speech output engines may include, for example, an LG (language generation) engine to generate spoken natural language sentences, a TTS (text to speech) synthesis engine to generate spoken output, etc.

In general, the individual-type prediction system (134) analyzes natural language dialog provided by a individual as the individual interacts with the system (130) using cultural knowledge in the cultural knowledge base (137) to automatically determine an individual's culturally acquired behavior with respect to collectivism-individualism and thereby gauge whether the individual has a tendency to be cooperative or uncooperative with automated customer service. More specifically, the behavior detection engine (135) uses culture based behavioral feature detection rules, models, parameters, etc., in the cultural knowledge base (137) to process an individual's natural language dialog responses to detect linguistic features/markers that are indicative of culturally acquired behaviors with respect to cultural dimension of individualism and collectivism. The individual type classification system (136) uses the detection results to classify the individual's cultural type (e.g., individualistic or collectivistic) according to individual type classification rules, models, parameters, etc. in the cultural knowledge base (137). The individual's cultural type is used to predict the individual's tendency to be cooperative or uncooperative with regard to automated customer service, wherein individuals manifesting Individualistic behavior are less likely to be uncooperative callers (and thus have a preference for automated self service) or individuals manifesting collectivistic behavior are more likely to be uncooperative callers (and thus have a preference for human or live Agent service).

In accordance with an exemplary embodiment of the invention, the behavior detection engine (135) processes natural language dialog responses of an individual (within initial dialog interaction such as, for example, within the first three dialog turns) and searches for certain predetermined linguistic markers/features that are indicators of individualistic and collectivistic behaviors. In accordance with one exemplary embodiment of the invention, a set of linguistic features that may be used as markers of distinctive specific cultural behaviors to determine an individual's culture type with respect to the cultural dimension of individualism and collectivism may include the following.

1. Prominence Given to Youth and Action:

If the individual's natural language dialog indicates a preference to use verbs or verbal forms and action words/phrase or active sentences such as: "I want to reset my lotus notes password" or "Reset password", the individual will be assigned a score/value for an individualistic type. By contrast, if the individual prefers to use nouns, adjectives or passives for example "Password", "Password support" "I have a problem with my password" "Password reset", then a score/value is assigned for collectivism.

2. Importance Given to Individualistic Versus Collectivistic Reference Forms:

If there is a preponderance of certain singular (individualistic) pronoun styles or if the individual starts out by identifying him/herself formally by name (without being asked to do so) then a score/value is assigned for individualism. For example, "I," or "I'm John Walker". By contrast, when an individual mainly uses references made up of products for example, the individual uses the name of a product as an identifier instead of drawing attention to himself/herself such as "The notebook is broken" or prefers to use collectivistic pronouns such as "we", then a score/value is assigned for collectivism.

3. Rhetorical Style:

If an individual employs a conversational/argumentative speech and displays tolerance or encouragement of extreme claims, then a score/value is assigned for individualism. For example, such individuals are likely to be more verbose and descriptive. By contrast, if an individual uses official slogans as well as subdued hyperbole, which implies a terse description with fewer words, then a score/value is assigned for collectivism.

4. Undergoing Sense of Social Morality:

If an individual displays behavior which shows emphasis on truth, then such an individual is more likely to curse and swear at the system and more likely tell the computerized service that it does not work well. In this instance, the individual is assigned a value of individualistic. By contrast, if the individual displays a desire to have relationships, for example displays a tendency to repeat his/herself within a single dialog turn or drastically slow down their speech (hyper talk, slowly speaking in order to be heard), then a score/value is assigned for collectivism.

5. Willingness to Provide Personal Information.

If the individual is willing and easily gives personal data such as employee serial number or social security number, then a score/value is assigned for individualism. By contrast, the differentiating behavior is one where the individual does not want to be identified separate from the group, for example, such an individual is likely to manifest "deletion" errors where instead of saying a 9-digit SSN or 6-digit employee serial number they unconsciously end up dropping (deleting) one of the digits, in which case when such errors occur automatically, a score/value is assigned for collectivism.

Figure 2:
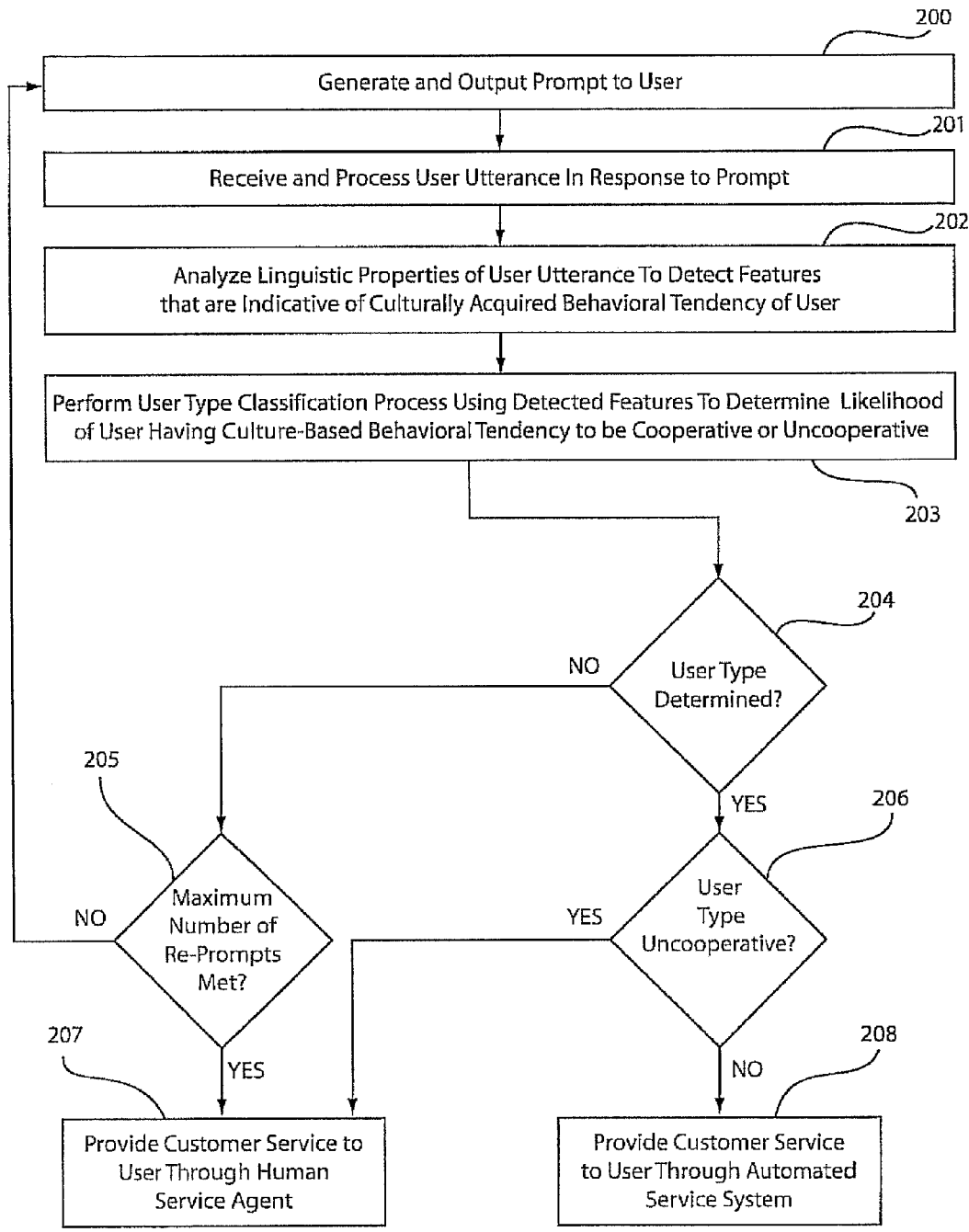
FIG. 2 is a flow diagram of a method for using cultural knowledge to automatically determine culture-based behavioral tendencies and preferences of individuals in the context of customer service interactions, according to an exemplary embodiment of the invention.

FIG. 2 is a flow diagram of a method for automatically determining culture-based behavioral tendencies of customers in customer service interactions, according to an exemplary embodiment of the invention. For illustrative purposes, the method of FIG. 2 will be described with reference to the system of FIG. 1, wherein the method of FIG. 2 can be considered a mode of operation of the system according to an embodiment of the invention. The method of FIG. 2 presumes that an individual session (or call connection) is established between the system (130) and individual of the client device (110), wherein the individual engages in an initial interactive dialog with an automated customer service application configured for a particular service. During the initial dialog interaction, depending on the UI interaction modality (e.g., speech or GUI), the system (130) can generate and output spoken and/or textual prompts to the individual (step 200), and the individual can respond to such prompts using spoken or written natural language dialog. For instance, the dialog interaction may begin with the system prompting the individual by asking "What is the reason for your call today?" or "How may I help you?".

The system (130) will receive and process the individual response to the prompt (step 201). For instance, for speech dialog, the system (130) will apply speech recognition to recognize and transcribe the spoken words and apply natural language understanding to the transcribed text to understand the context of the spoken input. For text input, the system can apply natural language understanding processing to understand the context of the response, for example. Depending on the individual's preference and behavioral tendencies in the context of man machine interaction in customer service interactions, the individual will respond to each prompt in different ways. For instance, the individual may actually utter the reason for calling or utter some other response unrelated to the reason for such call, or otherwise exhibit one of the external indicators of uncooperative behaviors as outlined above, for example.

Presuming that the natural dialog response of the individual is not a clear external indicator of uncooperativeness with regard to automated customer service interaction, the system will process the individual's natural language dialog response using cultural knowledge obtained from the cultural knowledge base to detect cognitive-psychological-linguistic features from the individual's natural language dialog, which are indicative of distinctive culturally acquired behaviors of individuals with certain culture traits (step 202). For instance, as noted above, the natural language dialog response of the individual can be analyzed using a cultural behavior detection process that attempts to extract/identify cognitive-psychological-linguistic features within the natural language dialog response that are indicative of individualistic behavioral tendencies and collectivistic behavioral tendencies.

By way of specific example, this process may involve analyzing the individual's natural language dialog responses using the set of linguistic markers that are relevant for the individual type with respect to the features of individualism versus collectivism, such as the various markers (1)~(5) discussed above. The feature detection process analyzes the natural language dialog response to identify features of individualism or collectivism using the relevant parameters and assign a score each time an instance of one of the parameters applies. For instance, the scores/values for linguistic markers indicating Individuality and Collectivism can be tracked and maintained during the initial dialog by tracking a number of Individualistic and Collectivistic markers detected, where a score value of 1 is added each time a given marker is detected.

For each dialog turn in a given number of initial dialog interactions (e.g., 3 rounds), the system will perform an individual type classification process using the detection results in an attempt to determine the cultural type of individual and predict a behavioral tendency of the individual to be cooperative or uncooperative with regard to automated customer service (step 203). In one exemplary embodiment of the invention where the scores/values for linguistic markers indicating Individuality and Collectivism are detected and accumulated, a classification process can be performed by a set of rules such as:

Used Individualistic markers [X] times=Individualistic Used Collectivistic markers [X] times=Collectivistic, where X is a threshold score. In other words, when the number of detected behavior features of individualism or collectivism meets a predetermined threshold amount [X], the individual can be classified as having individualistic or collectivistic behavioral tendencies.

At runtime, when an individual provides an initial natural dialog response on entering the system (initial dialog), the initial grammar active in this state will be compiled using these value-pairs and added up to the total score associated with each linguistic value. If the score for individualism or collectivism is greater than [X] and consistent within the sub-groups of attributes for a individual type, then the system concludes that caller is of a certain type (step 204) and will automatically make the decision whether to offer automated self service or not.

If the classification process (step 203) results in determination of the individual cultural type (affirmative determination in step 204), the individual's cultural type is used to predict the individual's tendency to be cooperative or uncooperative with regard to automated customer service. In particular, using these linguistic markers to determine individual-type helps to distinguish between two classes of individuals as follows:

(a) Individuals manifesting Individualistic behavior are less likely to be uncooperative callers (and thus have a preference for automated self service) or (b) Individuals manifesting Collectivistic behavior are more likely to be uncooperative callers (and thus have a preference for human or live Agent service).

If the individual's cultural type does not indicate a tendency of the individual to be uncooperative (negative determination in step 206), then the system will continue to provide customer service to the individual using the automated system (step 208). On the other hand, if the individual's cultural type does indicate a tendency of the individual to be uncooperative (affirmative determination in step 206), and then the system will switch the call to a human operator to provide customer service (step 207).

Referring back to step 204, if the individual type cannot be determined (negative determination in step 204) with some likelihood or degree of certainty (negative determination in step 204), the process flow (steps 200~203) will be repeated for a given number of dialog turns, such as 3 turns, where the system will prompt/re-prompt the individual with questions that would likely elicit responses from individuals with linguistic features indicative of cultural behaviors and tendencies that distinguish between individualism versus collectivism cultural types. In the initial dialog interaction between the individual and the automated system, the process flow (steps 200~203) will be repeated if the maximum number of dialog turns has not been exceeded (step 205). On the other hand, if the individual type has not been determined after a maximum number of dialogs turns has been met (affirmative determination in step 205), then the system will direct the individual to a human operator to provide customer service (step 207). In another embodiment, a user type can be determined after a predetermined number of natural dialog responses (e.g., 3 dialog turns) whereby the culture type of the individual will be determined based on which ever accumulated cross cultural value is higher. By using various factors (e.g., the 5 factors listed above), there will most likely always be a conclusion as to user type (e.g., collectivism or individualism), but in the case of an inclusive result (where a particular marker or feature failed to apply), then the customer service process can continue without reaching any conclusion, i.e., the person is simply sent to the human operator The exemplary method of FIG. 2 illustrates a process for making an automated system to be culturally aware to "detect" individuals' behavioral tendency without relying on the more erratic features of the current approaches that rely on external behaviors as indices of individual type. In this regard, the linguistic properties of an individual's utterance offer significant insights into the nature of individual behavior and preferences (without reliance on external actions) because individuals are "less" conscious of word choice even when they talk to a speech system. This process allows the system to predict a priori when the individual will display one of the external traits of uncooperativeness However, during the initial dialog with an individual, an individual may exhibit one or more external behaviors indicative of an individual's tendency to be uncooperative in the context of automated customer service and preference to interact with a live customer service agent. If the individual responds (in step 201) to a system prompt with one of the uncooperative caller traits that is indicative of the individual's preference for live customer assistance, the system can respond in one of various ways. In one embodiment, the system can simply direct the individual to a human service agent.

In another embodiment, the system can continue with the initial automated dialog interaction and re-prompt the individual for a given number of turns to determine the individual's cultural type and behavioral tendencies irrespective of the individual's initial external behaviors exhibiting uncooperativeness. For instance, assume that an initial dialog is as follows:

System: "Welcome to IBM customer care. How may I help you?

Individual: "I don't want to speak to a machine. Give me customer service representative.

With this dialog interaction, the individual's observable external behavior may, at the outset, show the individual's behavioral tendency to be uncooperative with automated systems. However, despite the initial behavior, the individual may indeed have a culturally acquired behavioral tendency that would indicate, in general, the individual's potential willingness to be cooperative with automated systems. Therefore, the automated customer service may re-prompt the individual as follows:

System: OK. I understand, but to help me ensure that I'll connect you to the right customer service Agent you have to state the reason for your call. So, what's the problem?

Individual: I need to reset my lotus Notes password.

By re-prompting the individual, the system can apply the background processing to the natural dialog input of the individual to detect individual type and predict the individual's culturally acquired tendency to be cooperative or uncooperative in the context of automated customer service interactions. In certain circumstances, even when the individual exhibits uncooperative behavior initially, the system may determine (via re-prompting) that the individual has a culturally acquired behavior tendency and preferences for automated systems. In this regard, by keeping the individual in the automated service (as opposed to directing to live service in response to the initial detected external behavior or uncooperativeness), the individual may actually continue with the automated service, thus obviating the need to redirect the call to a human operator.

There are various advantages associated with the above methods for predicting culturally acquired behaviors in the context of customer service interactions. For instance, the methods provide a way for computers to "detect" individuals' behavioral tendency without relying on the more erratic features of conventional approaches that rely on external behaviors as indices of individual type. In this regard, the linguistic properties of an individual's natural language responses offer significant insights into the nature of individual behavior and preferences (without reliance on external actions) because individuals are "less" conscious of word choice even when they talk to a speech system. Moreover, as compared to conventional approaches, exemplary methods discussed herein afford a systematic process that does not leave things to chance, i.e., there is no way to predict a priori when the individual will display one of the external traits of uncooperativeness. Instead, the inventive approaches discussed herein automatically determine behavioral markers from callers spoken input and use the results for determining a type of caller and then, subsequently, use that information to make a decision whether to offer self-service or not.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. An automated method for using cultural awareness for customer service systems, the method comprising the steps of:
   receiving as input natural language dialog responses from an individual in response to system prompts; and
   processing the natural language dialog responses to automatically determine a culturally acquired behavioral tendency of the individual to be cooperative or uncooperative with automated customer service, wherein the natural language dialog responses are processed to detect linguistic features that are indicative of culturally acquired behaviors for individualism and collectivism, and
   directing the individual to a live customer service agent if the individual is determined to be collectivistic.

2. The method of claim 1, wherein processing the natural language dialog responses to automatically determine a culturally acquired behavioral tendency of the individual, comprises the steps of:
   processing the natural language dialog responses to detect linguistic features that are indicative of culturally acquired behaviors for a plurality of distinct culture types; and
   using the detected linguistic features to classify the individual as likely having a distinct one of the plurality of culture types.

3. The method of claim 1, wherein processing the natural language dialog responses comprises processing only a predetermined number of initial natural language dialog responses during an initial interaction between the system and the individual.

4. The method of claim 3, wherein the predetermined number of initial natural language dialog responses is three.

5. The method of claim 3, wherein the method further comprises directing the individual to a live customer service agent if a culture type of the individual is not determined with a desired likelihood within the initial predetermined number of initial natural language dialog responses.

6. The method of claim 1, wherein processing the natural language dialog responses to automatically determine a culturally acquired behavioral tendency of the individual to be cooperative or uncooperative with automated customer service comprises processing the natural language dialog responses to determine if the natural language dialog responses are passive or active.

7. The method of claim 1, wherein processing the natural language dialog responses to automatically determine a culturally acquired behavioral tendency of the individual to be cooperative or uncooperative with automated customer service comprises processing the natural language dialog responses to identify types of pronouns used in the natural language dialog responses.

8. The method of claim 1, wherein processing the natural language dialog responses to automatically determine a culturally acquired behavioral tendency of the individual to be cooperative or uncooperative with automated customer service comprises processing the natural language dialog responses to determine a rhetorical style.

9. The method of claim 1, wherein processing the natural language dialog responses to automatically determine a culturally acquired behavioral tendency of the individual to be cooperative or uncooperative with automated customer service comprises processing the natural language dialog responses to determine the individual's willingness to provide personal information.

10. The method of claim 1, further comprising the step of providing automated customer service if the individual is determined to be individualistic.

11. A program storage device readable by a computer, tangibly embodying a program of instructions executable by the computer to perform methods steps for using cultural awareness for customer service systems, the method steps comprising:
receiving as input natural language dialog responses from an individual in response to system prompts; and
processing the natural language dialog responses to automatically determine a culturally acquired behavioral tendency of the individual to be cooperative or uncooperative with automated customer service, wherein the natural language dialog responses are processed to detect linguistic features that are indicative of culturally acquired behaviors for individualism and collectivism; and
providing automated customer service if the individual is determined to be individualistic.

12. The program storage device of claim 11, wherein the instructions for processing the natural language dialog responses to automatically determine a culturally acquired behavioral tendency of the individual, include instructions for:
processing the natural language dialog responses to detect linguistic features that are indicative of culturally acquired behaviors for a plurality of distinct culture types; and
using the detected linguistic features to classify the individual as likely having a distinct one of the plurality of culture types.

13. The program storage device of claim 11, further comprising instructions for directing the individual to a live customer service agent if the individual is determined to be collectivistic.

14. The program storage device of claim 11, wherein the instructions for processing the natural language dialog responses comprise instructions for processing only a predetermined number of initial natural language dialog responses during an initial interaction between the system and the individual.

15. The program storage device of claim 14, further comprising instructions for directing the individual to a live customer service agent if a culture type of the individual is not determined with a desired likelihood within the initial predetermined number of initial natural language dialog responses.

16. The program storage device of claim 11, wherein the instructions for processing the natural language dialog responses to automatically determine a culturally acquired behavioral tendency of the individual to be cooperative or uncooperative with automated customer service comprise instructions for processing the natural language dialog responses to determine if the natural language dialog responses are passive or active.

17. The program storage device of claim 11, wherein the instructions for processing the natural language dialog responses to automatically determine a culturally acquired behavioral tendency of the individual to be cooperative or uncooperative with automated customer service comprise instructions for processing the natural language dialog responses to identify types of pronouns used in the natural language dialog responses.

18. The program storage device of claim 11, wherein the instructions for processing the natural language dialog responses to automatically determine a culturally acquired behavioral tendency of the individual to be cooperative or uncooperative with automated customer service comprise instructions for processing the natural language dialog responses to determine a rhetorical style.

19. The program storage device of claim 11, wherein the instructions for processing the natural language dialog responses to automatically determine a culturally acquired behavioral tendency of the individual to be cooperative or uncooperative with automated customer service comprise instructions for processing the natural language dialog responses to determine the individual's willingness to provide personal information.

20. A computing system, comprising:
a processor system; and
a memory system that stores an application program comprising instructions that are processed by the processor system for the computing system to perform methods steps for using cultural awareness for customer service systems, wherein the method steps include receiving as input natural language dialog responses from an individual in response to system prompts, and processing the natural language dialog responses to automatically determine a culturally acquired behavioral tendency of the individual to be cooperative or uncooperative with automated customer service, wherein the natural language dialog responses are processed by the processor system to cause the computing system to detect linguistic features that are indicative of culturally acquired behaviors for individualism and collectivism, and the method steps further include providing automated customer service if the individual is determined to be individualistic.

21. The computing system of claim 20, wherein the application program includes instructions that are processed by the processor system to cause the computing system to detect linguistic features in the natural language dialog responses of the individual which are indicative of culturally acquired behaviors for a plurality of distinct culture types, and to use the detected linguistic features to classify the individual as likely having a distinct one of the plurality of culture types.

22. The computing system of claim 20, wherein the application program comprises instructions that are processed by the processor system to cause the computing system to direct the individual to a live customer service agent if the individual is determined to be collectivistic.

\* \* \* \* \*